United States Patent

Ahlrich

[11] 3,983,796
[45] Oct. 5, 1976

[54] EXHAUST FUME TREATMENT APPARATUS

[76] Inventor: Willard K. Ahlrich, 321 N. Pine Lake Road, Stuart, Fla. 33494

[22] Filed: Jan. 30, 1975

[21] Appl. No.: 545,438

Related U.S. Application Data

[63] Continuation-in-part of Ser. No. 338,871, March 7, 1973, Pat. No. 3,865,022.

[52] U.S. Cl. .............................. 98/115 K; 55/406; 55/408; 55/DIG. 36
[51] Int. Cl.[2] ........................................ F23J 11/00
[58] Field of Search ................... 98/115 R, 115 K; 55/406, 407, 408, 409, DIG. 36, DIG. 40

[56] References Cited
UNITED STATES PATENTS

| | | | |
|---|---|---|---|
| 2,889,007 | 6/1959 | Lune | 98/115 K |
| 3,073,095 | 1/1963 | Hungate | 55/408 X |
| 3,073,096 | 1/1963 | Hayes, Jr. | 55/408 X |
| 3,217,976 | 11/1965 | Downs | 55/406 |

FOREIGN PATENTS OR APPLICATIONS

| | | | |
|---|---|---|---|
| 1,205,723 | 2/1960 | France | 55/408 |

Primary Examiner—William F. O'Dea
Assistant Examiner—Ronald C. Capossela
Attorney, Agent, or Firm—Woodhams, Blanchard and Flynn

[57] ABSTRACT

An exhaust fume treatment apparatus for removing suspended or entrained material from a gas including a substantially cylindrical housing having a peripheral wall and inlet and outlet openings in opposite end walls. A slinger wheel is rotatable within the housing and has circumferentially spaced, nonoverloading blades. A blower has its inlet connected to the outlet of the housing. Polluted fumes are drawn into the housing by the blower and pass outwardly through the slinger blades whereby the materials in the gas are deposited on, and thrown substantially radially outwardly by the blades, toward the peripheral wall of the housing for collection. A two stage gas deflector within the slinger wheel spreads the flow of gas more uniformly over the slinger wheel blades. A cylindrical screen encircles the slinger wheel and has plural openings angled toward the housing inlet end. The slinger wheel and the impeller of the blower are arranged for independent rotation, and a washing mechanism may be included for washing the interior of the apparatus.

19 Claims, 12 Drawing Figures

EXHAUST FUME TREATMENT APPARATUS

CROSS REFERENCE TO RELATED APPLICATION

This application is related to my pending U.S. application Ser. No. 338,871, filed Mar. 7, 1973, now U.S. Pat. No. 3,865,022, and is a continuation-in-part thereof.

The present application incorporates by reference the specification and drawings of my said copending related U.S. application Ser. No. 338,871, now U.S. Pat. No. 3,865,022.

BACKGROUND OF THE INVENTION

This invention relates to exhaust fume treatment apparatus and, more particularly, relates to apparatus for removing materials from an entraining exhaust gas utilizing a rotating wheel and housing to effect such separation.

Although use in other environments is contemplated, the present invention arose in connection with the development of exhaust hood systems and integrated exhaust hood-air curtain systems usable in a variety of situations in which fumes produced by a device are to be exhausted from an enclosure in which the device is located and in such a way as to protect personnel or the like adjacent such device from deleterious or unpleasant effects which might be caused by such fumes. Cook tops or the like in food preparation establishments including restaurants, hamburger stands, etc. provide one example of situations to which the present invention is directed.

In such establishments, the air above such cooking apparatus (for example, griddles, grills, open deep fat frying vats, kettles, pressure cookers, etc.) may frequently carry objectionable quantities of fatty or greasy materials in suspension or entrainment. Thus, the present invention, in materially reducing or substantially eliminating the level of foreign materials, such a grease particles or the like, from air exhausted therethrough, is intended to improve environmental quality. While the embodiments disclosed in my related application Serial No. 338,871 now Pat. No. 3,865,022, above mentioned, achieve this end in a generally satisfactory manner, the embodiments herein disclosed in detail further improves my basic invention by enhancing contaminant removal performance and providing additional operational advantages.

Therefore, the objects of this invention include provision of:

1. An exhaust fume treatment apparatus which removes solid or liquid particles from an exhaust gas preparatory to releasing same to the atmosphere.

2. Apparatus, as aforesaid, particularly adapted from use in combination with exhaust hood constructions, with or without air curtain devices.

3. Apparatus, as aforesaid, with is capable of effective operation over long periods of time without attention, which tends to be self-cleaning in use, which provides for convenient elimination of contaminant materials extracted from exhaust air flowing therethrough and which provides for positive entrapment of material particles removed from the exhaust gas to prevent reentry of such particles into the exhaust gas flow.

4. Apparatus, as aforesaid, in which incoming contaminated gas is deflected for more uniform distribution along the blades of the slinger wheel, particularly to increase contact with the upstream blade ends, and to impart a preliminary rotation to such incoming gas.

5. Apparatus, as aforesaid, in which the slinger wheel blade configuration tends to migrate contaminant materials accumulated thereon toward the upstream, or entry, end of the slinger wheel, preparatory to throwing accumulated masses tangentially.

6. Apparatus, as aforesaid, in which thrown contaminant masses are deflected toward the entry end of the apparatus by a screen having correspondingly angled openings therethrough.

7. Apparatus, as aforesaid, in which gases leaving the slinger wheel are subjected to reversals in radial direction after leaving the slinger wheel housing, including radial reversals by a further deflector arrangement in the tunnel coupling the outlet of the slinger wheel housing with a suction blower.

8. Apparatus, as aforesaid, in which slinger wheel tip speed may be set at optimum regardless of blower speed, slinger wheel rotational speed can be held at a desired level substantially below the rotational rate of the suction impeller, and wherein cooperatively arranged but separately driveable telescoped shafts support the slinger wheel and suction impeller.

9. Apparatus, as aforesaid, in which provision is made for cleaning of portions of the apparatus, when desired, without need for apparatus disassembly.

Other objects and purposes of this invention will be apparent to persons acquainted with apparatus of this general type upon reading the following specification and inspecting the accompanying drawings.

Figure 1:
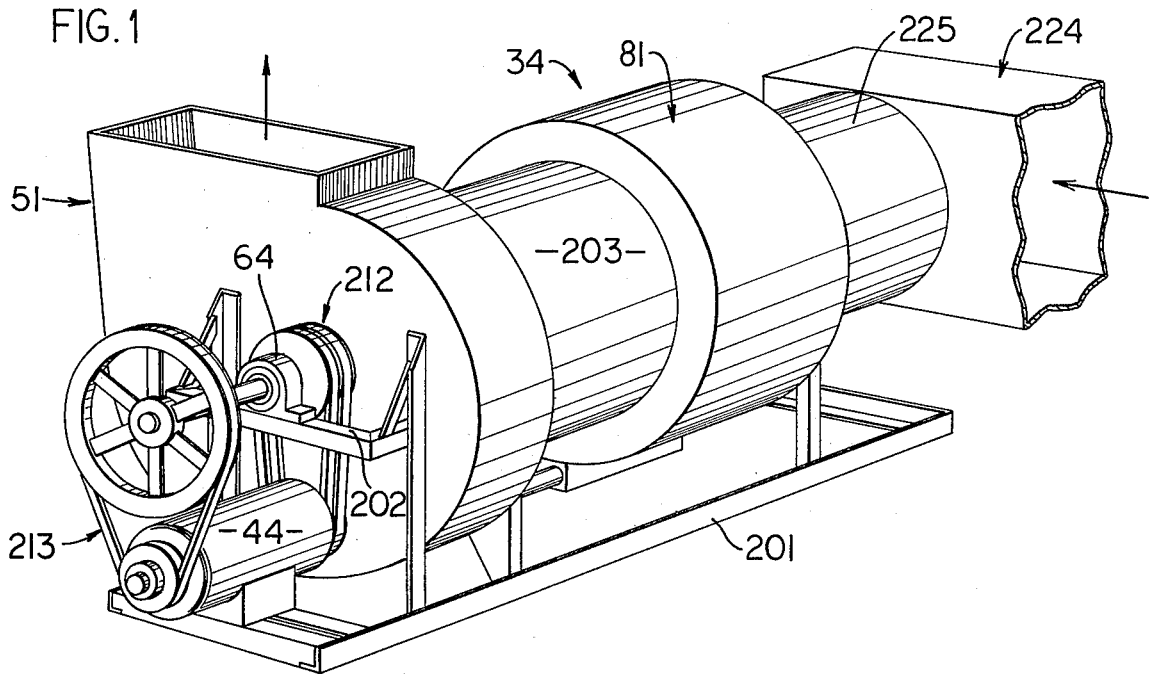
FIG. 1 is a fragmentary, oblique view of an exhaust fume treatment apparatus embodying the invention.

Certain terminology will be used in the following description for convenience in reference only and will not be limiting. The words "up", "down", "right" and "left" will designate directions in the drawing to which reference is made. The words "front" and "rear" will refer to the direction of gas flow through the apparatus, forwardly being the normal flow direction. The words "in" and "out" will refer to directions toward and away from, respectively, the geometric center of the device and designated parts thereof. Such terminology will include derivatives and words of similar import.

SUMMARY OF THE INVENTION

The objects and purposes of this invention are met by providing an exhaust fume treatment apparatus for removing suspended or entrained material from a gas including a substantially cylindrical housing having a peripheral wall and inlet and outlet openings in opposite end walls. A suction blower is coupled to the outlet of the housing. A slinger wheel rotatable within the housing has an open face opposed to the inlet and a plurality of circumferentially spaced blades angled so the radially outer edge of each trails its radially inner edge during normal rotation of the shaft. Fumes drawn into the housing inlet by the suction blower pass outwardly through the blades and outlet. Materials in the gas are deposited on and thrown substantially radially outwardly by the blades toward the peripheral wall of the housing for collection. Improvements include a generally Z-section, twisted slinger wheel blade with a partially tapered outer edge flange for enhancing build-up of contaminant masses at the slinger wheel inlet end. In a modification, the major profiles of the blades and slinger wheel are tapered. A two stage gas deflector within the slinger wheel enhances uniformity of gas flow and contaminant build-up as to the slinger wheel blades. A screen radially interposed between the slinger wheel and extractor housing periphery has openings angled toward the extractor housing inlet end. A tunnel interconnects the extractor housing and suction blower, housing a slinger wheel shaft, a bearing therefor and a further deflector. A further shaft, rotatably telescoped on the slinger wheel shaft, carries the suction blower impeller. Separate shaft drives permit a slinger wheel rotation speed less than that of the suction blower impeller. A washing device may be included.

DETAILED DESCRIPTION

Turning to the accompanying drawings, attention is first directed to components having a general, though not specific, correspondence to my aforementioned referenced application Ser. No. 338,871, now U.S. Pat. No. 3,865,022.

Figure 2:
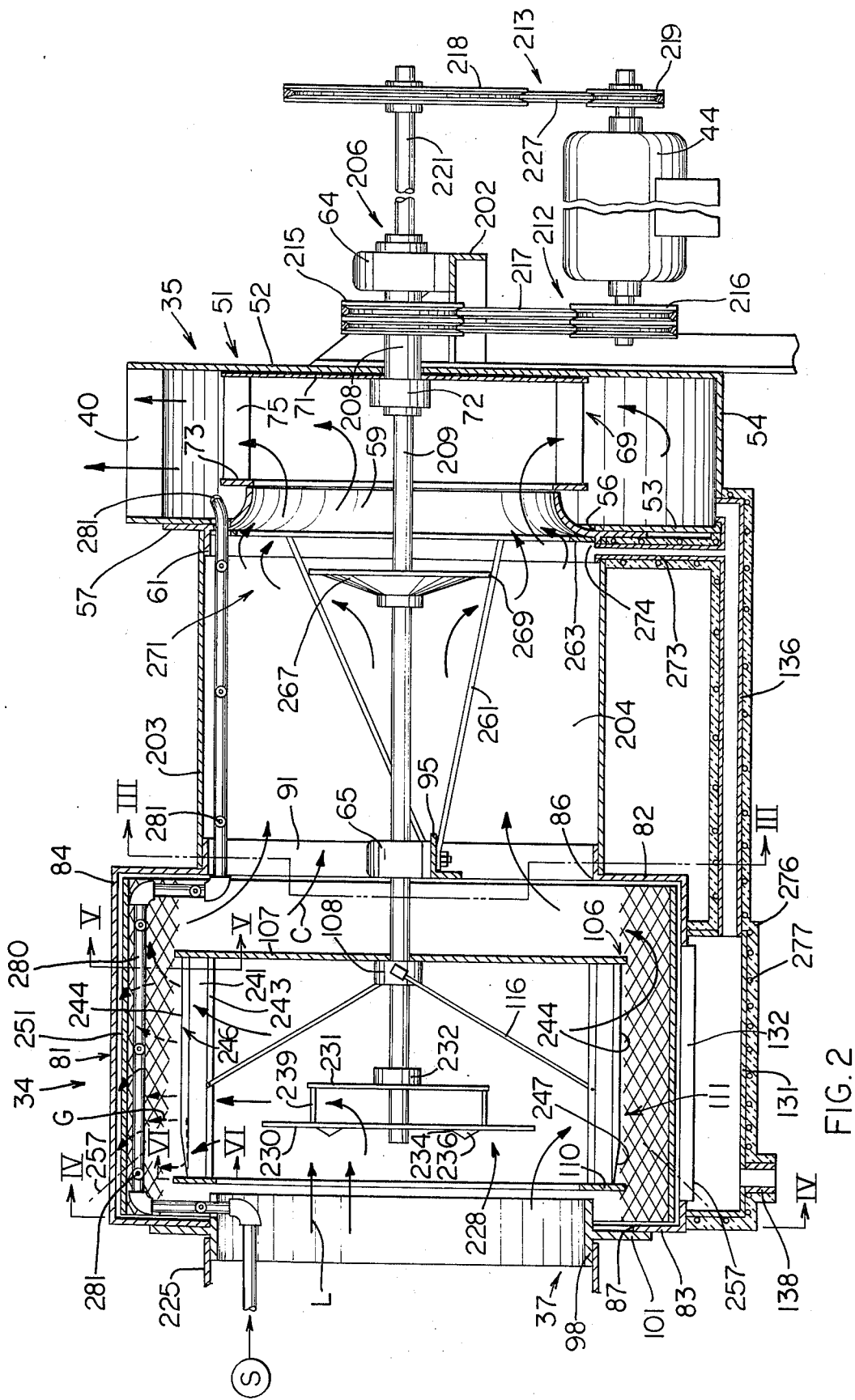
FIG. 2 is an enlarged, fragmentary side view, substantially in central cross section, of the apparatus of FIG. 1.

Thus, FIG. 2 herein discloses an extractor 34 having an inlet 37 for contaminant-bearing gases, and an exhaust blower 35 having an outlet 40 and driven by a motor 44 in a manner hereafter discussed. The exhaust blower 35 is preferably a conventional single inlet centrifugal blower comprising a housing 51, including end walls 52 and 53 and a spiral-shaped peripheral wall 54. A bearing 64 is fixed with respect to wall 52. An inlet port 56 in the left end wall 53 is faced by an adaptor ring assembly, preferably of welded construction, including an inlet cone 59, cylindrical adaptor 61 and annular plate 57, all fixed with respect to the side wall 53, as by bolts not shown.

A conventional, open ended centrifugal blower wheel 69 is disposed in the blower housing 51. The wheel 69 includes a rightward end plate 71 having a hub 72 securable to a shaft assembly hereafter discussed, an annular left end plate 73 and axially extending blower blades 75 for, upon rotation in one direction, moving gas rightwardly through the collar 59 and out the outlet 40.

The extractor 34 includes a substantially cylindrical housing 81 comprising end walls 83 and 82 having respective coaxial inlet and outlet openings 87 and 86. The extractor inlet 37 is defined by a cylindrical inlet collar 98 located within opening 87 by an annular flange 101 secured to side wall 83, as by screws not shown.

An annular flange 91 is fixed, preferably welded, to the edge of extractor outlet opening 86. A transverse web 95 extends chordally across the annular flange 91 near the center thereof, preferably being fixed thereto by welding, and fixedly supports a bearing 65.

A slinger wheel 106 is spaced within the extractor housing 81 and includes a rightward end plate 107 having a hub 108. The end plate 107 is spaced axially between the bearing 65 and inlet collar 98 and radially inward from housing peripheral wall 84. The annular left end plate 110 of slinger wheel 106 is coaxially supported on rightward end plate 107 by preferably identical, circumferentially spaced and axially extending blades 111, and is adjacent the inlet collar 98. The blades preferably have end flanges 112 for connection to the plates 107 and 110, as by rivets. The slinger wheel may include diagonal bracing rods 116 between the hub 108 and ones of the blades.

A collection trough 131, fixed as by welding to the bottom of the extractor housing 81, extends along at least the major length of housing 81. A preferably downwardly flanged waste outlet opening 132 in the bottom of the extractor housing peripheral wall communicates with trough 131. A conduit 136 couples bottom portion of the blower housing 51 with the trough 131. The trough 131 has an outlet conduit 138 terminated as desired.

Turning now more specifically to the improvement disclosed herein and wherein the present disclosure departs from that of my referenced application above mentioned, attention is first directed to FIGS. 1-2 herein.

The extractor housing 81 and blower housing 51, supported by a suitable framework 201, are coupled by an elongate cylindrical tunnel 203. The tunnel 203 preferably snugly sleeves over the adaptor member 61 and axial flange 91 and is fixed thereto, as by screws not shown, for defining an elongate flow passage coupling the interiors of the housing 81 and 51 substantially in gas tight relation.

The framework 201 here includes a support 202 fixedly locating the bearing 64 on the closed rightward end wall 52 of the blower housing 51, coaxially of the blower wheel 69.

While it is contemplated that the slinger wheel 106 may be rotatably supported and driven independently of the blower wheel 69, by a separate motor located substantially in place of bearing 65 in FIG. 2, the preferred embodiment employs a telescoped shaft assembly 206 and common drive motor 44 for supporting and driving the wheels 106 and 69.

The shaft assembly 206 (FIG. 2) includes a hollow stub shaft 208 rotatably supported at its rightward end by bearing 64. The stub shaft 208 extends leftwardly through an opening in blower housing wall 52 and adjacent its leftward end fixedly supports the hub 72 of blower wheel 69 for rotation therewith.

The shaft assembly 206 further includes an elongate inner shaft 209 which extends coaxially through the hollow stub shaft 208 and is rotatably supported therein, as by conventional sleeve bearings, not shown.

The elongate shaft 209 extends leftwardly from the stub shaft 208, through the tunnel 203 and partially into the extractor housing 81. The elongate shaft 209 fixedly supports the slinger wheel hub 108 and extends through a major portion of the length of the slinger wheel. The bearing 65 rotatably supports the leftward portion of the shaft 209 and slinger wheel 106. The bearing 65 and shaft 209 also radially support the leftward end of stub shaft 208. The shafts 208 and 209 are axially fixed, as by collars at the bearings 64 and 65.

As shown in FIG. 2, the blower wheel 69 and slinger wheel 106 are independently driven, normally at different speeds by a common motor 44 through separate drives 212 and 213. Advantages include elimination of a costly second motor and the ability to precisely and reliably preselect and control the speeds of such wheels. The motor 44 here has oppositely extending shaft ends. The drive 212 comprises dual pulleys 215 and 216 respectively fixed on stub shaft 208, between blower housing wall 52 and bearing 64, and on the leftward shaft end of motor 44, and coupled by conventional V-belts 217. The drive 213 comprises single pulleys 218 and 219 respectively fixed to a rightward extension 221 of elongate shaft 209 and the rightward shaft end of motor 44 and coupled by a V-belt 222. The ratios of the drives 212 and 213 are preferably selected such that the slinger wheel is driven at optimum blade tip speed and the blower wheel provides optimum airflow velocity through the blades of the slinger wheel, both for maximum efficiency. Thus, a small diameter, higher speed blower wheel can be used with a relatively large diameter, low speed slinger wheel, permitting an increase in the number, and total area, of slinger wheel blades for greater gas contact and contaminant extraction capacity, without an undesired increase, beyond optimum, in slinger wheel blade tip speed. Thus, as shown in FIG. 2, the pulley ratios of drives 212 and 213 cause motor 44 to keep the slinger wheel shaft 209 at a lower speed than blower wheel shaft 208. The blower wheel drive 212 is the more heavily loaded of the two drives and employs dual belts 217, in contrast to the single belt 222 in slinger wheel drive 213.

The extractor inlet 37 is normally coupled to a desired source of contaminant laden gas to be cleaned, such as grease laden air. As seen in FIG. 1, an inlet duct 224, which for example may be conventionally connected to a cook-top range hood, receives incoming air or gas indicated by the arrow L directed thereinto and routes same through a cylindrical extension 225 anugly secured to inlet collar 98 (FIG. 2).

The extractor 34 includes means for enhancing axial distribution uniformity of extracted contaminants therein, and which thereby contribute to greater extraction efficiency, in the sense of greater percentage removal of contaminant materials from the incoming gas. Attention is now directed to components of the extractor 34 contributing to such increased distribution uniformity.

Thus, a multi-part gas deflector 228 (FIGS. 2 and 4) comprises axially spaced, preferably circular primary and secondary plates 230 and 231. The plates, or discs, 230 and 231 are coaxial with shaft 209 within and spaced intermediate the ends of the slinger wheel 106. The secondary plate 231 lies approximately half-way between the axial ends of the slinger wheel 106 and is preferably less than half the outside diameter thereof. A coaxial hub 232 on the secondary plate 231 fixedly locates the deflector 228 on the shaft 209.

Figure 4:
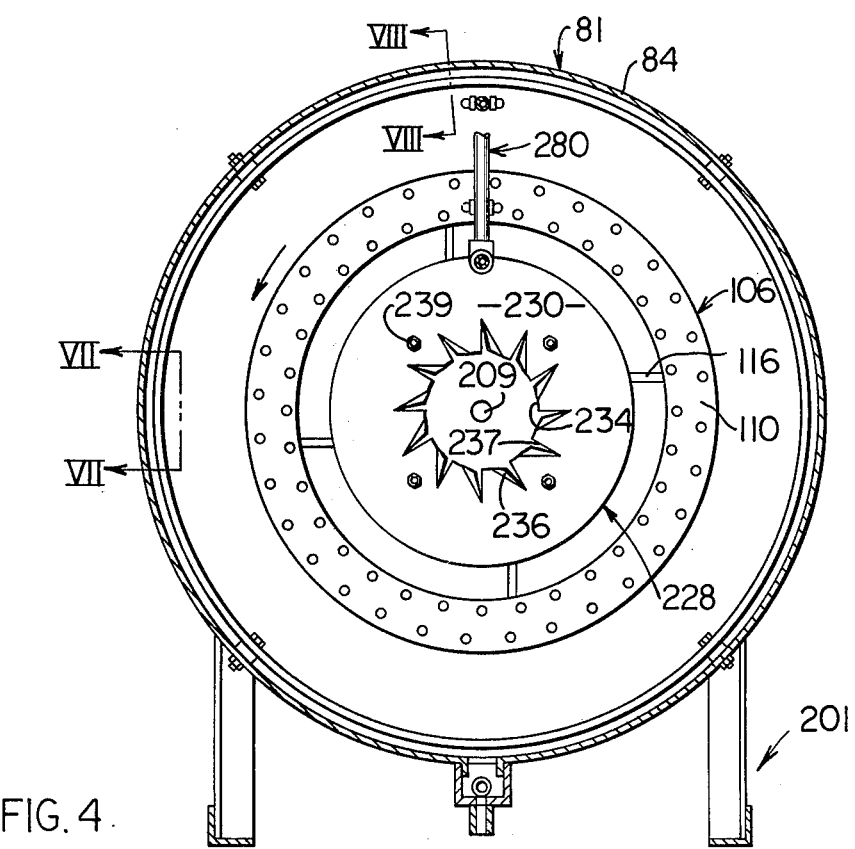
FIG. 4 is a sectional view substantially taken on the line IV—IV of FIG. 2.

The annular primary plate 230 radially overlaps the periphery of secondary plate 231. The periphery of annular plate 230 preferably extends to more than half the diameter of the slinger wheel 106, but is spaced inboard of the slinger wheel blades 111. The plate 230 is spaced upstream of secondary plate 231 and is preferably in the upstream (left) half of the slinger wheel 106. The inner periphery of the annular plate 230 is spaced outward of shaft 209 by a gas passage 234 (FIG. 4) to the face of secondary plate 231. Blade-like tabs 236 at the inner periphery of primary plate 230 extend upstream and in part an initial rotation to the adjacent incoming gas flow. The tabs 236 are preferably angled to the shaft axis and adjacent radii of primary plate 230, as shown in FIG. 4, and tend also to impel adjacent incoming gas through passage 234 and against secondary plate 231. In the preferred embodiment shown, circumferentially spaced, radial cuts 237 (FIG. 4) in the inner peripheral portion of plate 230 result in circumferentially adjacent, substantially trapezoidal flaps 238, triangular leading edge portions of which are bent to form the tabs 236. Axial members, such as spacer bolts 239, extend upstream from secondary plate 231 and support the primary plate 230 for rotation with the shaft 209.

Figure 6:
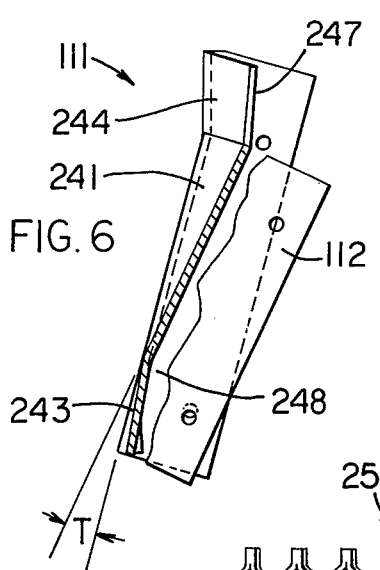
FIG. 6 is an enlarged fragmentary cross sectional view substantially as taken on the line VI—VI of FIG. 2.
Figure 5:
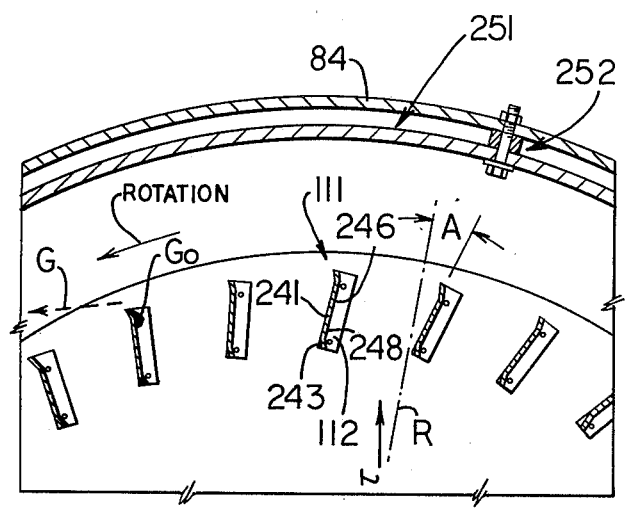
FIG. 5 is an enlarged fragmentary cross sectional view substantially as taken on the line V—V of FIG. 2.

The slinger wheel blades 111 (FIGS. 2, 5 and 6) may vary in number. However, in one wheel, tests indicate improved performance with 32 blades, as compared with 16.

Each blade 111 is of substantially Z-shaped cross section (FIG. 5) having an axially extending central web 241 of substantially rectangular shape. The central web 241 of the mounted blade is angled, as at A, to a radius R of the slinger wheel, such that its radially outer portion trails its radially inner portion during normal rotation of the slinger wheel. Integral inner and outer longitudinal edge flanges 243 and 244, respectively, extend from the central web 241 and are oppositely circumferentially angled from the web to respectively lag and lead same during normal wheel rotation. A trailing trough 248 is thus formed by the central web 241 and inner flange 243. The outer flange 244 and the adjacent portion of the central web 241 have trailing contaminant material accumulation surfaces 246. The upstream (left in FIG. 2) end portion of the outer flange 244 tapers, e.g. is cut away on a slope, at 247. Thus the radial width of the outer flange 244, at the upstream extremity thereof goes substantially to zero. The longitudinal extent of the tapered portion 247 is preferably between about ⅛ and ¼ of the blade length. In addition, the blade 111 is twisted (see FIG. 6) about its longitudinal axis and throughout its length, such that the tapered, upstream end portion 247 of the outer flange 244 trails the downstream end thereof during normal slinger wheel rotation.

A cylindrical screen 251 coaxially extends substantially the length of the extractor housing 81. The screen 251 is spaced closely radially inboard from the housing peripheral wall 84 and substantially further radially outboard of the slinger wheel 106. The screen 251 is fixedly located, preferably by spaced bolt-spacer assemblies 252 (FIG. 5), though a screen of sufficient stiffness tending to resume a flat condition may sufficiently rigidly locate itself in the housing merely with backing spacers on the peripheral wall 84.

Figure 7:
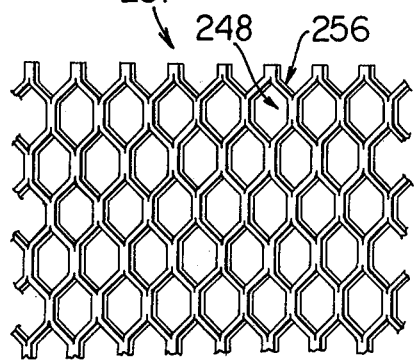
FIG. 7 is an enlarged cross sectional view substantially taken on the line VII—VII of FIG. 4.
Figure 8:
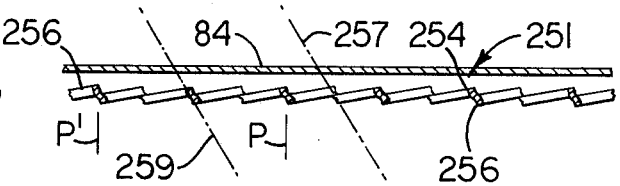
FIG. 8 is an enlarged fragmentary cross sectional view substantially taken on the line VIII—VIII of FIG. 4.

The screen 251 comprises a portion of a commercially available expanded metal sheet, in which the open area, defined by the openings 254 (FIG. 7) substantially exceeds the closed area, defined by the integral, narrow, elongated segments 256 of the sheet. The openings 254 through the expanded metal sheet 251 are inclined. The openings have parallel axes 257 (FIG. 8) inclined to perpendiculars P of the plane of the sheet 251. Restated, the segments 256 bounding the openings 254 all have faces with parallel inclinations or inclination components 259 which define the inclination of the bounded openings 254 with respect to the plane of sheet 251.

It is important, in the present invention, that the expanded metal sheet 251 be oriented with its inclined openings 254 angled in the proper one of the several possible directions. Thus, according to the present invention, the screen 251 is so oriented within the extractor housing (FIG. 2) such that the outwardly extending axes 257 of the openings 254 are angled axially toward the inlet (leftward) end of the extractor housing. The openings 254 thus tend to channel contaminant particles, thrown from the slinger wheel 106, toward the inlet end of the extractor housing 81.

Figure 3:
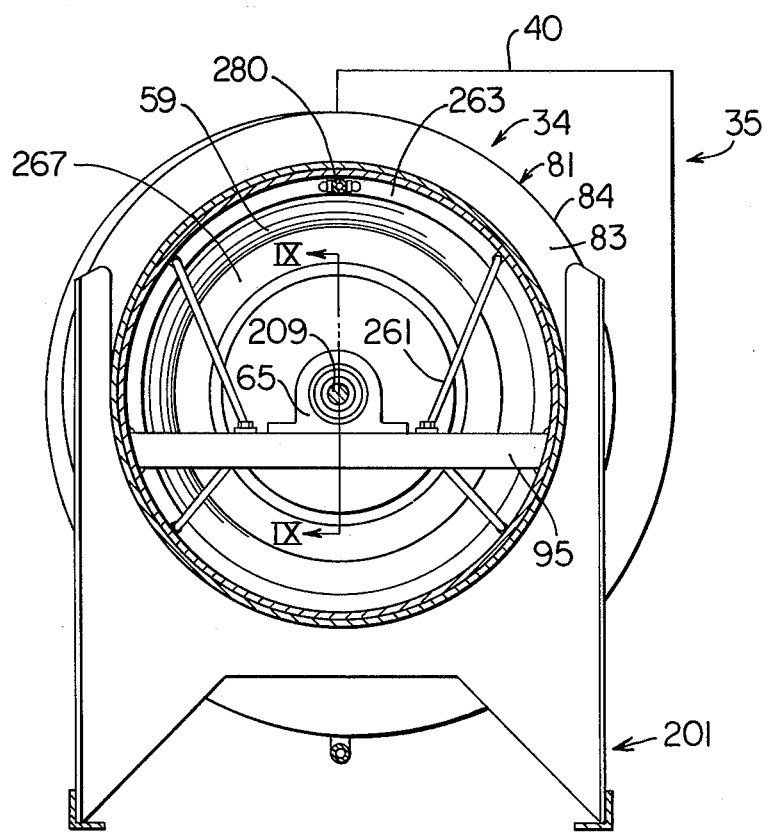
FIG. 3 is a sectional view substantially taken on the line III—III of FIG. 2.

Within the flow passage 204 defined by tunnel 203 (FIGS. 2 and 3), a plurality, here four, of symmetrically and substantially evenly circumferentially spaced struts 261 extend convergently upstream toward the bearing 65. The downstream ends of the struts 261 are anchored to a preferably planar ring 263 concentric with and fixed, as by bolts, to the upstream face of blower inlet cone 59 adjacent the wall of tunnel 203. The upstream ends of the struts 261 are fixed to the bearing supporting web 95. The struts 261 eliminate axial vibration in bearing 65 and in shaft 209 and enable mounting of the bearing 65 axially close to the slinger wheel 106 to provide adequate rotational support therefor.

Figure 9:
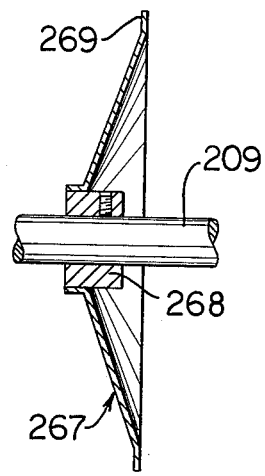
FIG. 9 is an enlarged central cross sectional view substantially taken on a line IX—IX of FIG. 3.

A further deflector 267 (FIGS. 2, 3 and 9) includes a hub 268 fixed to the shaft 209, by any conventional means, for rotation therewith. While it is contemplated that the deflector 267 may be a flat disc, it is preferably formed as a shallow cone convergent toward its upstream end and having a narrow radial edge flange 269 as shown. The deflector 267 is about one-half the diameter of the tunnel 203 and lies axially close to the ring 263. A reduced flow cross section zone 271 is thus defined between the deflector 267 and the tunnel periphery and ring, whereby to subject passing gas flow to several reversals in radial direction, with accompanying decelerations. A contaminant exit conduit 273 couples the bottom of an annular low gas velocity space 274, at the "corner" formed by ring 263 and the adjacent periphery of tunnel 203 with the drain conduit 136.

The contaminant drain portion of the apparatus, including trough 131 and conduits 136 and 273, is preferably covered with any conventional insulative material, as schematically indicated at 276 (FIG. 2). This is particularly useful where the incoming gas-contaminant mixture has an elevated temperature and extracted contaminants tend to solidify when cooled toward ambient temperature. The drain structure, including trough 131, conduits 136 and 273 and outlet 138, is somewhat remote from the gas flow through the apparatus and such contaminant materials may tend to cool and become less flowable therein. In such instance, the insulation 276 reduces heat loss from the drain system, keeping contaminants therein flowable. Under more extreme conditions a heating means, such as electrical heating coils 277, energized by a conventional source not shown, may be placed against the surfaces of the drain system 131, 138, 136 and 273, within the insulation 276.

The apparatus of FIGS. 1–9 is normally substantially self-cleaning in use, wherein at least the great majority of extracted contaminant materials exit through the drain outlet 138. However, it is contemplated that in some instances, as with especially sticky or adhesive contaminant materials, occasional cleaning may be desired. To this end, a wash pipe 280 (FIGS. 2-4) extends through the upper portion of extractor inlet 37, offsets upwardly along entry wall 83, extends downstream immediately inboard of the screen 251, downwardly along the downstream extractor end wall 82, downstream within the upper portion of the tunnel 203, through openings in the ring 263 and cone 59, and terminates in the upper portion of blower housing 51. Plural spray nozzles 281, preferably laterally directed, are spaced along the length of the pipe 280. A conventional and externally located source S is actuable to supply a solvent or wash liquid solution under pressure to the pipe 280 and the resulting spray from the nozzles 281 cleans the interior surfaces of housings 81 and 51, tunnel 203, and components therein, of adhering contaminant materials, which flush out through the drain system outlet 138. Such cleaning means, when supplied, will normally be used only periodically, preferably when the apparatus is not in the process of extracting contaminants from an incoming contaminant-laden gas.

While the present invention is not limited to particular dimensions, the following tabulation indicates, for the sake of example, approximate dimensions employed in one unit built in accord with the present invention.

| | |
|---|---|
| Extractor housing 81 | 38″ O.D. × 23″ long |
| Slinger Wheel 106 | 30″ O.D. × 15″ long |
| | spacing to wall 82 approx. 5″ |
| Blade 111 | approx. 2¾″ wide |
| | axial twist from end to end of 5° to 10° |
| Deflector 228 | Plate spacing approx. 2¼″ |
| | Plate 230: 18″ O.D. × 7″ I.D. |
| | Plate 231: 12″ I.D. with spacing to end plate 107 of about 8″ |
| Screen 251 | spacing to wall 84 approx. ¾″ |
| Tunnel 203 | 26″ dia. × 22″ long |
| Deflector 267 | 12″O.D. × 1½ long |
| Blower housing 51 | Shaft axis to scroll bottom 21″ |
| | Shaft axis to scroll top 16″ |
| | Shaft axis to top of outlet 18¼″ |
| | length 9½″ |
| Blower wheel 69 | 24″ O.D. × 7″ long |

OPERATION

While the operation of the FIG. 1–9 embodiment is generally indicated above, and certain basic operational concepts are detailed in my referenced application Ser. No. 338,871, the operation of the FIG. 1–9 embodiment herein is summarized, for convenience, below.

With the extractor inlet 37 coupled to a source of contaminant-laden gas, e.g. a cook-top hood, as through inlet extension 225 and duct 224, and the drain conduit 138 terminated as desired, operation is initiated by energizing motor 44 (FIG. 2) to rotate shafts 208 and 209 at respective speeds determined by the ratios of drives 212 and 213. The rotating blower wheel 69 draws gas from extractor inlet 37 radially outwardly through the bladed portion of slinger wheel 106 and tunnel 203, and expels the cleaned gas through blower outlet 40. The solid line arrows L (FIG. 2) and solid line arrows C generally indicate gas flow to and from, respectively, the slinger wheel blades 111. The broken line arrows G generally indicate the migration of portions of accumulated contaminant masses along the blades, the movement of contaminant masses tangentially thrown from the blade and the movement of contaminant masses through the screen 251.

I have found that, absent the deflector 228, gas flow through the slinger wheel 106 tends to disproportionately concentrate at the downstream (rightward in FIG. 2) ends of the blades 111 and that a disproportionately large part of the contaminant material collected on the blades 111 is at such downstream ends thereof. Such results in reduced extraction efficiency (in terms of percent of contaminants extracted from the contaminated gas flow). Particularly, it is believed that, under such condition, contaminants approach the downstream blade ends at excessive concentrations and velocities and connot be fully collected by the blades, whereas the quantity per unit time of contaminants approaching the upstream blade ends is substantially under the collection capability of the blades. Thus the amount of gas per unit time which can be processed and the percentage of contaminants removed are reduced. A modification in my referenced application Ser. No. 338,871 improved this situation somewhat with a small deflector disc located somewhat downstream of center in the slinger wheel.

However I find, from continuing efforts to improve the apparatus disclosed in my referenced application Ser. No. 338,871, now U.S. Pat. No. 3,865,022, that gas distribution uniformity along the blades and extraction performance are further enhanced by the two stage deflector 228 of FIGS. 2 and 4 herein. Thus, a portion of the incoming gas stream passes through the central opening of primary deflector 230, and is deflected radially by the upstream face of secondary plate 231. Other incoming gas is initially rotated by the adjacent tabs 236, part thereof also being deflected through the central opening 234 and part thereof moving radially outwardly, even with a somewhat reversed (leftward) motion, along the leftward face of plate 230. Further incoming gas reflects from the annular upstream face of plate 230 radially and somewhat axially reversely outwardly. The remaining incoming flow enters the slinger wheel substantially axially outboard of the deflector 228 and interacts with the deflected flow portions above discussed. The result is substantial axial uniformity in distribution of the gas flow outward between the blades 111.

The gas L (FIGS. 2 and 5) moving outwardly through the bladed periphery of the slinger wheel 106 normally tends (momentarily ignoring drive 213) to rotatably drive the slinger wheel, in the same direction as the blower wheel, and may be thought to push on the trailing faces of the blades 111. Thus, if free to rotate on its shaft, the slinger wheel 106 would be rotated by gas flow drawn therethrough by the suction blower 35.

Indeed, a relatively compact but high speed blower wheel could, by such gas flow, rotate a free wheeling larger diameter slinger wheel at above optimum blade tip speed, degrading extraction efficiency. However, increasing slinger wheel diameter beyond that of the blower wheel advantageously permits increasing the number of slinger wheel blades and hence the slinger wheel surface area available for accumulation of contaminant materials from the gas flow. Thus, in the particular embodiment shown in FIG. 2, a relatively small, hence economical blower wheel is rotated at a relatively high speed, whereas a notably larger diameter slinger wheel has its rotational speed fixed at a slower rotational rate for optimum extraction by drive 213. Depending on the gas flow drawn through the slinger wheel, the drive 213 may be negative, that is, impose a braking force on the slinger wheel to prevent such gas flow from overspeeding the slinger wheel.

As the gas flow L strikes and is deflected by the blades 111, it tends to slow and deposit entrained contaminants on the blades, particularly on the trailing accumulation surfaces 246 at and adjacent the outer edge flanges 244. While accumulated contaminant masses on the blades (as at $G_o$ FIG. 5) in part tend to be thrown tangentially from the blades, the axial twist T (FIG. 6) in the blades, causing the upstream end of flange 244 to trail the downstream end thereof, results in migration of a portion of the accumulated contaminants upstream along the blades toward the cut-away portion 247. The cut-away portion 247, by tapering the upstream accumulation surface area of the outer flange 244, enhances release of contaminant masses from the upstream portion of the blade. This increases the proportion of accumulated contaminates thrown from the upstream blade end of the blades. Such increase counteracts the tendency of contaminant materials to accumulate and/or migrate downstream on the blades, as due to the net axial downstream movement of gas flow adjacent the tips of the blades. More particularly, gas flow out of the wheel 106 takes on a downstream motion component preparatory to movement past the extractor end wall 82 and tunnel 203.

Despite slowing of the gas flow by the blades 111 and the large annular gas flow space radially outboard of the slinger wheel tending again to keep gas velocity and entrainment capability low, the net downstream axial gas movement in this area may tend to angle somewhat axially downstream the normally tangential path of accumulated masses thrown from the wheel. On the other hand, it is desirable that masses thrown from the wheel 106 reach the screen 251 with a relatively uniform axial distribution. Thus, it becomes additionally desirable to eliminate disproportionately heavy gas flow and contaminant accumulation at the downstream end of the slinger wheel. Thus, the aforementioned uniform distribution on the blades enhances the desired uniform distribution of contaminants at the screen 251. Indeed uniformity in the latter distribution is substantially attainable even with somewhat greater amounts of contaminant materials thrown from the upstream, as compared with the downstream, portions of the blades.

Axial uniformity of contaminant material accumulation on the extractor housing peripheral wall 84 is desirably enhanced by the angling of the screen hole axes 257, which tends to impart an axially upstream motion component to particles moving through the screen holes despite the net downstream movement of adjacent gas flow between the screen and slinger wheel.

As a result of this attention to uniformity of distribution by use of deflector 228, the particular configuration of blades 111 and arrangement and configuration of screen 251, increased extraction efficiency, in terms of percentage of contaminant materials removed from the gas stream has been obtained.

The cleaned gas flow, indicated by arrows C (FIG. 2), exits from between the slinger wheel and housing end wall 82 and enters the tunnel 203. I have found radially nonuniform gas flow in the tunnel 203, with greater gas density adjacent the shaft 209 than near the tunnel periphery. To counteract this and simultaneously provide a secondary extraction capability for even further reduction of contaminants in the flow, the deflector 267 angularly deflects the gas flow outwardly from the shaft 209 and toward the annular corner area 274. Upon encountering the ring 263, the gas flow is deflected inward, undergoing radial deceleration and tending to deposit remaining contaminants, if any, in the annular corner zone 274, before entering the blower 35.

Accumulated contaminants behind screen 251 and, if any, in the annular corner zone 274 drain downwardly along the cylindrical wall of the housing 84 and tunnel 203 and into trough 131 directly or through conduits 273 and 136.

Despite the high proportion of open area in the screen, its close spacing from the extractor housing peripheral and end walls substantially reduces the velocity of any gas flow in the "dead air" space between the screen and extractor housing peripheral wall 84. Such reduces possible reentrainment of contaminants behind the screen by the gas flow passing out of the slinger wheel and toward the tunnel 203.

Spent cleaning liquid from the wash apparatus 280, 281 drains from the housings 84 and 51 and tunnel 203 automatically through the drain system 131. Thus, such a periodic cleaning of the housings 84 and 51 and tunnel 203, and of their contents tends to clean the drain system as well.

MODIFICATION

Figure 10:
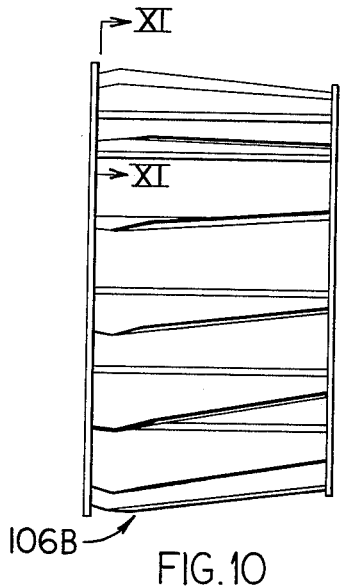
FIG. 10 is a side view of a modified slinger wheel construction, useable in place of that shown in FIG. 2.
Figure 11:
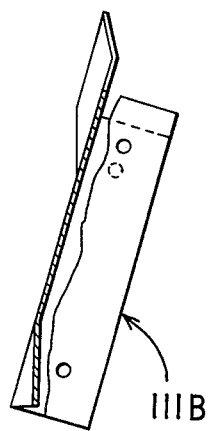
FIG. 11 is an enlarged, fragmentary sectional view taken on the line XI—XI of FIG. 11.
Figure 12:
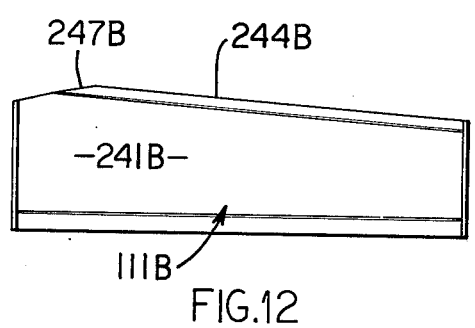
FIG. 12 is a side view of a blade of the modified slinger wheel of FIG. 10.

FIGS. 10–12 disclose a modified slinger wheel 106B with modified blades 111B. The primary modification is that the radially outer edge of the central web 241B of blade 111B is angled and diverges from the inner web edge toward the upstream end of the slinger wheel. Thus, the upstream end of the central web 241B is wider than the downstream end and the upstream end 247B of outboard flange 244B lies radially offset beyond its downstream end. Correspondingly, the upstream diameter of modified slinger wheel 106B is greater than its downstream diameter. Such results in an increase in blade tip speed from downstream to upstream blade ends, tending to further enhance, due to increased centrifugal force, upstream migration of contaminant materials along the accumulation zone of the blade 111B and to increase throwing of contaminant masses from the slinger wheel upstream end. The central web 241B in this modification is flat, rather than twisted.

While the apparatus of FIGS. 1–12 herein is disclosed with a horizontal shaft axis, adaptation to a vertical axis orientation is contemplated. In the latter instance, the drain system 131 may be eliminated or, preferably, rearranged with its feeder conduits coupled to the bottom end walls of the of the housings 81 and 51.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an exhaust fume treatment apparatus for removing contaminant materials from the gas, the combination comprising:
   a substantially cylindrical extractor housing with an inlet and an outlet in opposite end walls thereof;
   suction blower means coupled to said extractor housing for moving gas through said extractor housing;
   a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) substantially tangentially throwing said masses and (3) increasing the proportion of masses thrown therefrom near said extractor housing inlet, said blade means each including a central web with nonparallel substantially axially extending edges, the radially outer said web edge having its end nearest said inlet trailing its outlet end and mounting a flange tapered near said inlet end of said web, so as to achieve said increase;
   a substantially cylindrical screen radially spaced between said slinger wheel and extractor housing periphery and having openings angled outwardly and toward the extractor housing inlet end for directing the thrown masses out of the gas flow from said slinger wheel and with a component of motion toward the extractor housing inlet end;
   whereby to more uniformly axially distribute contaminant masses collected in the zone between said screen and housing peripheral wall despite net axial gas movement toward said housing outlet.

2. The apparatus of claim 1 including a substantially horizontally extending tunnel connecting said extractor housing outlet with an inlet opening of said suction blower means, annular means within said tunnel at its outlet end for changing the direction of gas flow and thereby tending to remove any remaining contaminants therefrom, said annular means including an annular corner defined by interconnecting surfaces of said tunnel and suction blower means and providing a low gas velocity space, drain means pendent from said extractor housing means and suction blower means and including a contaminant exit conduit pendent from said tunnel at said corner for draining contaminant materials from said space.

3. The apparatus of claim 2 including means at least reducing loss of heat from said drain means for preventing solidification and loss of flow capability in elevated termperature contaminants received therein, said reducing means consisting of at least one of heating means and insulation on said drain means.

4. The apparatus of claim 1 in which said nonparallel radially inner and outer central web edges are so arranged that, when looking along a diametral plane of said slinger wheel extending through said central web, said central web appears to narrow toward its axially downstream end and hence toward the outlet end of said extractor housing.

5. In an exhaust fume treatment apparatus for removing contaminant materials from the gas, the combination comprising:

a substantially cylindrical extractor housing with an inlet and an outlet in opposite end walls thereof;

suction blower means coupled to said outlet for drawing gas through said extractor housing;

a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) migrating said masses toward said inlet, and (3) substantially tangentially throwing said masses, said blade means each comprising a blade of substantially Z-shaped cross section including a central web angled to a radius of the slinger wheel such that the outer portion thereof trails the inner portion thereof during normal rotation of said slinger wheel and inner and outer longitudinal edge flanges oppositely circumferentially angled from respective inner and outer edges of said central web to respectively lag and lead same during normal rotation of said slinger wheel, the outer flange and adjacent web portion having trailing contaminant material accumulation surfaces, the axial end portion of said outer flange adjacent said extractor housing inlet tapering along its outer edge toward the inlet end of said slinger wheel, for enhancing migration of accumulated contaminant material masses along the blade toward the inlet end of said slinger wheel to at least reduce disproportionately large accumulation and throwing of masses from the end of said slinger wheel adjacent said extractor housing outlet;

a substantially cylindrical screen spaced between said slinger wheel and extractor housing periphery and having openings angled outwardly and toward the extractor housing inlet end for directing the thrown masses out of the gas flow from said slinger wheel and with a component of motion toward the extractor housing inlet end;
whereby to more uniformly axially distribute contaminant masses collected in the zone between said screen and housing peripheral wall despite net axial gas movement toward said housing outlet.

6. The apparatus of claim 5 in which the central web of said blade tapers toward the outlet end of said wheel and has a disproportionately larger gas contacting width adjacent the inlet of said extractor housing, at least a portion of the blade taper being along the outer longitudinal edge thereof and resulting in axial tapering of the periphery of the slinger wheel profile, the slinger wheel inlet end diameter exceeding the slinger wheel outlet end diameter.

7. The apparatus of claim 5 in which said blade is twisted about its longitudinal axis such that the tapered end portion of said outer flange circumferentially trails the remaining end portion thereof, thereby additionally enhancing migration of accumulated contaminant material masses along the blade toward the inlet end of said slinger wheel.

8. In an exhaust fume treatment apparatus for removing contaminant materials from the gas, the combination comprising:
a substantially cylindrical extractor housing with an inlet and an outlet in opposite end walls thereof;
suction blower means coupled to said outlet for drawing gas through said extractor housing;
a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) migrating said masses toward said inlet, and (3) substantially tangentially throwing said masses;
a substantially cylindrical screen spaced between said slinger wheel and extractor housing periphery and having openings angled outwardly and toward the extractor housing inlet end for directing the thrown masses out of the gas flow from said slinger wheel and with a component of motion toward the extractor housing inlet end, said screen comprising an expanded metal sheet in which the open area substantially exceeds the closed area, the closed area being defined by integral, narrow, elongate segments of said sheet, the width dimensions of said segments being angled toward the periphery and inlet end of said extractor housing, for additionally reducing the tendency of thrown material masses to disproportionately collect adjacent the outlet end of said extractor housing, in view of net axial gas movement toward said outlet;
whereby to more uniformly axially distribute contaminant masses collected in the zone between said screen and housing peripheral wall despite net axial gas movement toward said housing outlet.

9. Apparatus according to claim 8 in which said screen extends substantially the length of said extractor housing and has ends at least closely adjacent the end walls of said housing, the screen being radially spaced from the periphery of said slinger wheel and radially substantially more closely spaced inward from the extractor housing periphery, whereby said screen tends both to reduce gas turbulence and associated noise and to provide substantially a dead gas space upward therefrom to the periphery of the extractor housing.

10. In an exhaust fume treatment apparatus for removing contaminant materials from the gas, the combination comprising:
a substantially cylindrical extractor housing with an inlet and an outlet in opposite end walls thereof;
suction blower means coupled to said outlet for drawing gas through said extractor housing;
a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) migrating said masses toward said inlet, and (3) substantially tangentially throwing said masses;
a substantially cylindrical screen spaced between said slinger wheel and extractor housing periphery and having openings angled outwardly and toward the extractor housing inlet end for directing the thrown masses out of the gas flow from said slinger wheel and with a component of motion toward the extractor housing inlet end, whereby to more uniformly axially distribute contaminant masses collected in the zone between said screen and housing peripheral wall despite net axial gas movement toward said housing outlet;

cleaning means connectible to a wash liquid source and extending therefrom into said extractor housing between said slinger wheel and screen, said cleaning means including a plurality of nozzles directed toward said screen and slinger wheel for spraying cleaning liquid thereon.

11. The apparatus of claim 10 in which said cleaning means comprises a pipe extending from said source substantially axially through the upper portion of said inlet, upwardly along the inlet wall of said housing, along the upper portion of said housing adjacent and inboard of said screen, said blower having a housing, said extractor housing and blower housing being coupled by an elongate tunnel, said pipe having an extension through the upper portion of said tunnel to said blower housing, said pipe and extension being provided along its length with said nozzles, said nozzles being directed at least sidewardly for cleaning the interiors of said housings and tunnel.

12. In an exhaust fume treatment apparatus for removing contaminant materials from the gas, the combination comprising:

a substantially cylindrical extractor housing with an inlet and an outlet in opposite end walls thereof;

suction blower means coupled to said outlet for drawing gas through said extractor housing;

a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) migrating said masses toward said inlet, and (3) substantially tangentially throwing said masses;

a substantially cylindrical screen spaced between said slinger wheel and extractor housing periphery and having openings angled outwardly and toward the extractor housing inlet end for directing the thrown masses out of the gas flow from said slinger wheel and with a component of motion toward the extractor housing inlet end, whereby to more uniformly axially distribute contaminant masses collected in the zone between said screen and housing peripheral wall despite net axial gas movement toward said housing outlet;

a substantially cylindrical tunnel connecting the extractor housing outlet to the inlet of said suction blower means;

a substantially conical gas deflector spaced within said tunnel, said deflector being about one-half the diameter of said tunnel and having its narrow end toward said slinger wheel, a rotatably driven shaft extending through said suction blower means and tunnel into said extractor housing, said deflector and slinger wheel being fixed to said shaft for rotation therewith.

13. The apparatus of claim 12 in which said shaft extends substantially coaxially through said suction blower means, tunnel and extractor housing, said suction blower means including an inlet ring surrounding the inlet thereof and located in said tunnel, bearing means adjacent the extractor housing outlet for rotatably supporting said shaft and a plurality of convergently angled, elongate struts fixed to said inlet ring and terminating at said bearing means for stabilizing same.

14. The apparatus of claim 12 including a further gas deflector disposed within said slinger wheel and rotatable with said shaft, said further deflector comprising an annular deflector member having a toothed central opening and backed by a disc-like second deflector spaced from the extractor housing inlet by said annular member for receiving gas flow through the central opening of said annular member and deflecting same radially outwardly as further gas flow is deflected radially outwardly and circumferentially spun by said annular member.

15. In an exhaust fume treatment apparatus for removing contaminant materials from the gas, the combination comprising:

a substantially cylindrical extractor housing with an inlet and an outlet in opposite end walls thereof;

suction blower means coupled to said outlet for drawing gas through said extractor housing;

a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) migrating said masses toward said inlet, and (3) substantially tangentially throwing said masses;

a substantially cylindrical screen spaced between said slinger wheel and extractor housing periphery and having openings angled outwardly and toward the extractor housing inlet end for directing the thrown masses out of the gas flow from said slinger wheel and with a component of motion toward the extractor housing inlet end, whereby to more uniformly axially distribute contaminant masses collected in the zone between said screen and housing peripheral wall despite net axial gas movement toward said housing outlet;

said suction blower means comprising a centrifugal blower housing and wheel, the inlet of such blower housing being coaxially spaced from said extractor housing outlet by a substantially cylindrical gas flow tunnel, rotatable motor means adjacent said blower housing, bearing means fixed with respect to said blower housing opposite said blower housing inlet, a hollow blower shaft rotatably supported on said bearing means and extending into said blower housing for supporting said blower wheel for rotation therewith, an elongate further shaft telescoped within said hollow blower shaft for rotation with respect thereto and extending through said blower housing and tunnel and into said extractor housing for supporting said slinger wheel for rotation therewith, further bearing means rotatably supporting said elongate shaft adjacent said extractor housing outlet and drive means individually coupling said motor means to said shafts and for driving said slinger wheel at a higher rotational speed than said blower wheel.

16. In an exhaust fume treatment apparatus for removing contaminant materials from the gas, the combination comprising:

a substantially cylindrical extractor housing with an inlet and an outlet in opposite end walls thereof;

suction blower means coupled to said outlet for drawing gas through said extractor housing;

a rotatable, substantially cup-shaped slinger wheel in said extractor housing and opening towards said inlet, the peripheral portion of said slinger wheel comprising a circumferentially spaced plurality of substantially axially extending, gas contacting blade means responsive to gas flow therebetween toward said outlet for (1) massing thereon contaminant materials from said gas, (2) migrating said masses toward said inlet, and (3) substantially tangentially throwing said masses;

a rotatable shaft supporting said slinger wheel for rotation therewith, a gas deflector on said shaft intermediate the ends of said slinger wheel, said gas deflector comprising first and second coaxial discs spaced along and fixed with respect to said rotatable shaft, said first disc being located closest to said extractor housing inlet and being annular and having an inner peripheral edge spaced outwardly from said shaft, said inner peripheral edge having a plurality of circumferentially arranged and blade-like tabs extending toward said extractor housing inlet for circumferentially rotating the incoming gas flow while directing a portion thereof axially through the open central portion of said first disc and a remaining portion substantially radially outwardly toward blade means of said slinger wheel adjacent the inlet ends thereof, said second disc being of lesser outer diameter than said first disc and being spaced from said slinger wheel inlet thereby for deflecting gas incoming through the central opening of said first disc radially outwardly toward the opposed substantially central portions of said blade means, said first disc having an outer periphery spaced more closely to the blade means than to said shaft for causing portions of the incoming gas flow which would otherwise move past the outlet ends of said blade means to pass nearer to the inlet ends of said blade means and thereby provide a more uniform distribution of gas flow over the length of said slinger wheel;

a substantially cylindrical screen spaced between said slinger wheel and extractor housing periphery and having openings angled outwardly and toward the extractor housing inlet end for directing the thrown masses out of the gas flow from said slinger wheel and with a component of motion toward the extractor housing inlet end;

whereby to more uniformly axially distribute contaminant masses collected in the zone between said screen and housing peripheral wall despite net axial gas movement toward said housing outlet.

17. Exhaust fume treatment apparatus for removing contaminant materials from a gas, comprising in combination:

a substantially cylindrical extractor housing having a peripheral wall and an inlet and an outlet in opposite end walls thereof;

suction blower means coupled to the outlet of said housing for drawing gas therethrough and having a rotatably driven shaft extending into said housing;

a slinger wheel on and rotatable by said shaft and located in said housing, said slinger wheel having an open face adjacent said inlet and a plurality of circumferentially spaced gas contacting blades each angled so that the radially outer edge thereof trails the radially inner edge thereof during normal rotation of said shaft, the opposed downstream ends of said slinger wheel and housing being spaced by an open air passage unoccupied except by said shaft;

a shield spaced closely radially inboard of said peripheral wall of said housing by a dead air space and being spaced remotely radially outwardly of said slinger wheel by a reduced gas velocity zone, the radial extent of said reduced gas velocity zone being at least several times that of said dead air space, said shield at least partially circumferentially surrounding said slinger wheel, said shield being pierced by a plurality of holes for receiving contaminant masses thrown outwardly by said slinger wheel and admitting same to said dead space between said shield and said housing peripheral wall;

means for increasing axial uniformity of material build-up on said blades comprising a radially extending air deflector fixed to said shaft axially within said slinger wheel, the periphery of said deflector being spaced radially intermediate the shaft and inner slinger blade edges;

a hollow subshaft rotatably telescoped on said slinger wheel shaft at said suction blower means, said suction blower means including an impeller for drawing gas through said extractor housing and slinger wheel and fixed on said hollow shaft for rotation therewith; and drive means rotatably coupled to said shafts for rotatably driving said suction blower impeller at a first speed while maintaining said slinger wheel at a second lower speed despite gas movement through said slinger wheel by said suction blower impeller.

18. The apparatus of claim 17 in which said outer and inner blade edges are defined by longitudinal flanges angled respectively toward and away from the direction of the slinger wheel rotation and with respect to an intervening central portion of said blade, a portion of said outer flange being omitted at the upstream end of said blade, said blade being warped such that the upstream portion of said outer flange trails downstream end thereof during normal rotation of said slinger wheel, whereby to increase throwing of collected contaminant materials from the upstream blade ends.

19. The apparatus of claim 18 in which the holes in such shield are angled radially outwardly and toward the inlet end of said extractor housing for increasing collection of contaminant materials at the upstream end of said extractor housing.

* * * * *